Oct. 22, 1968  C. B. DE VLIEG ET AL  3,406,796
MACHINE TOOL SPINDLE FEED AND DRIVE MECHANISM
AND CONTROL SYSTEM THEREFOR
Filed Dec. 15, 1966  10 Sheets-Sheet 2
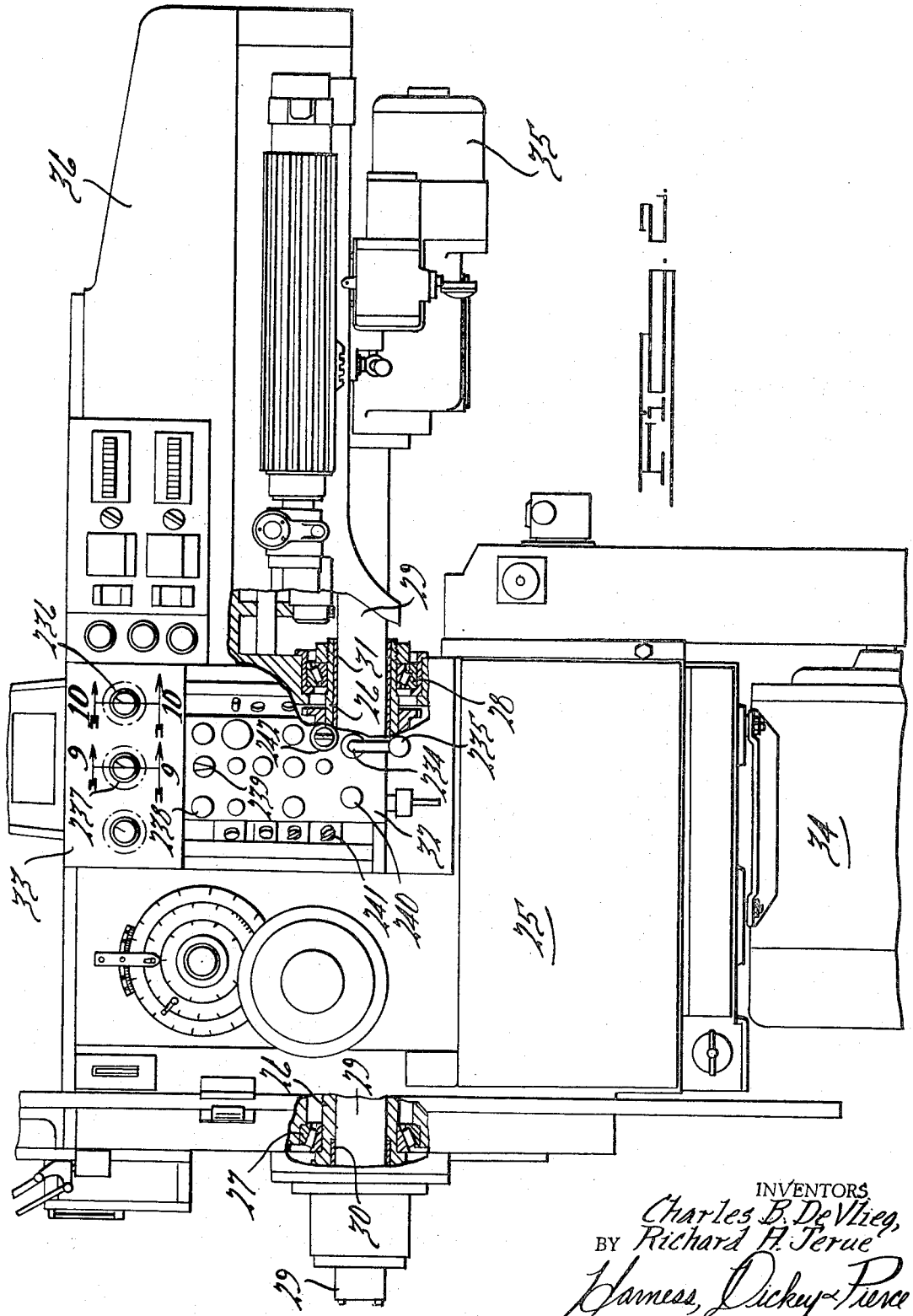
INVENTORS
Charles B. DeVlieg,
BY Richard A. Ferue
Harness, Dickey & Pierce
ATTORNEYS

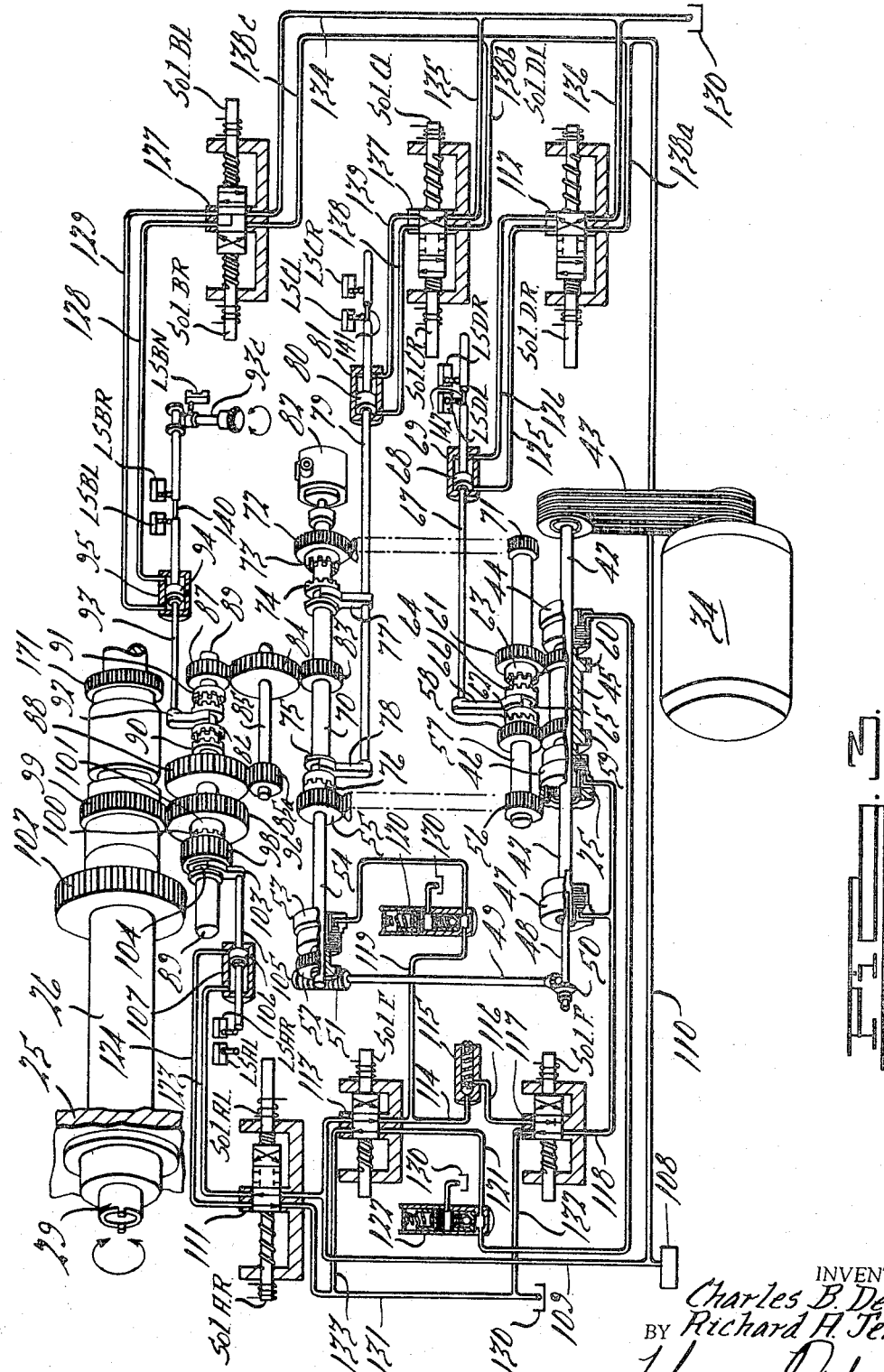

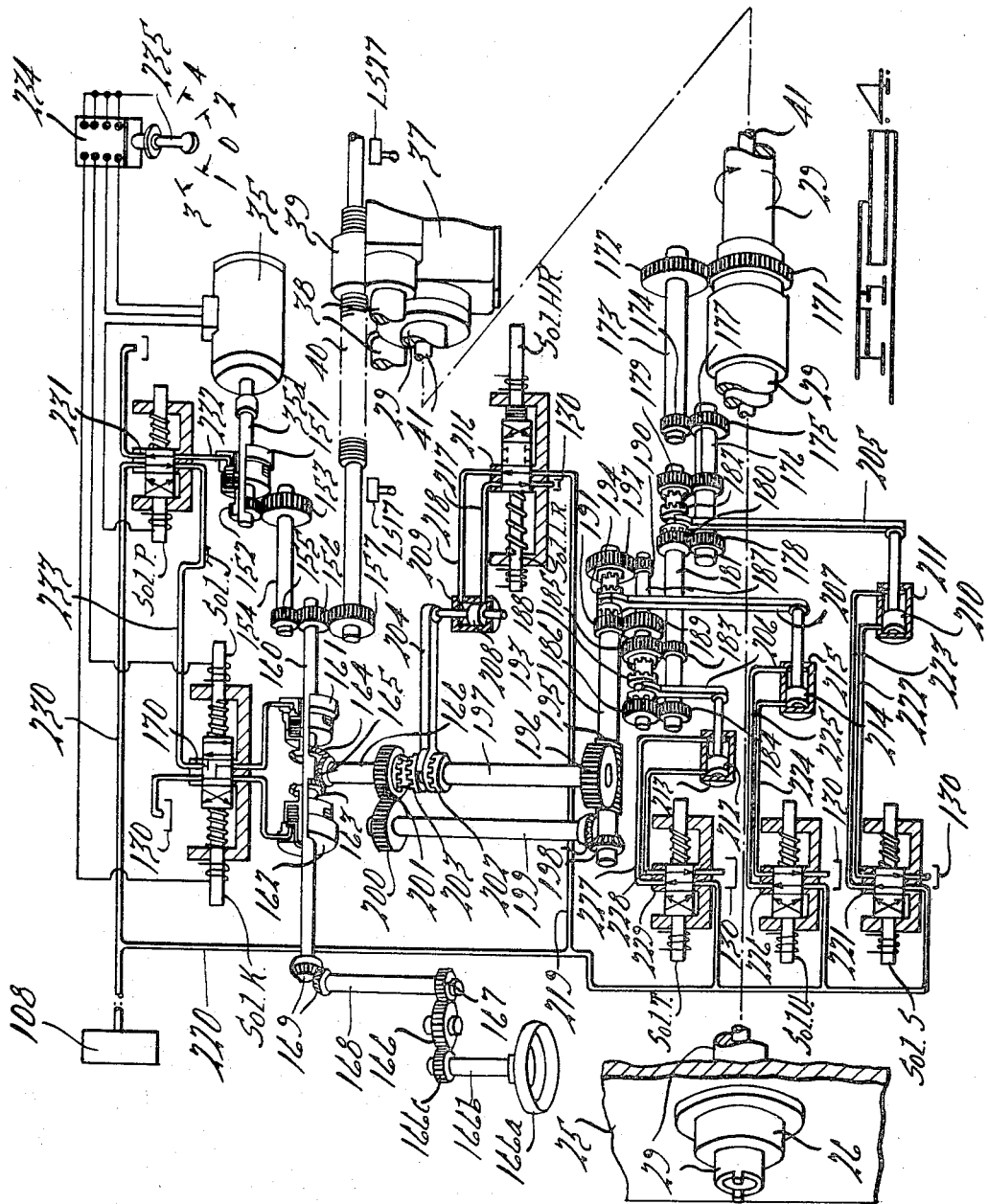

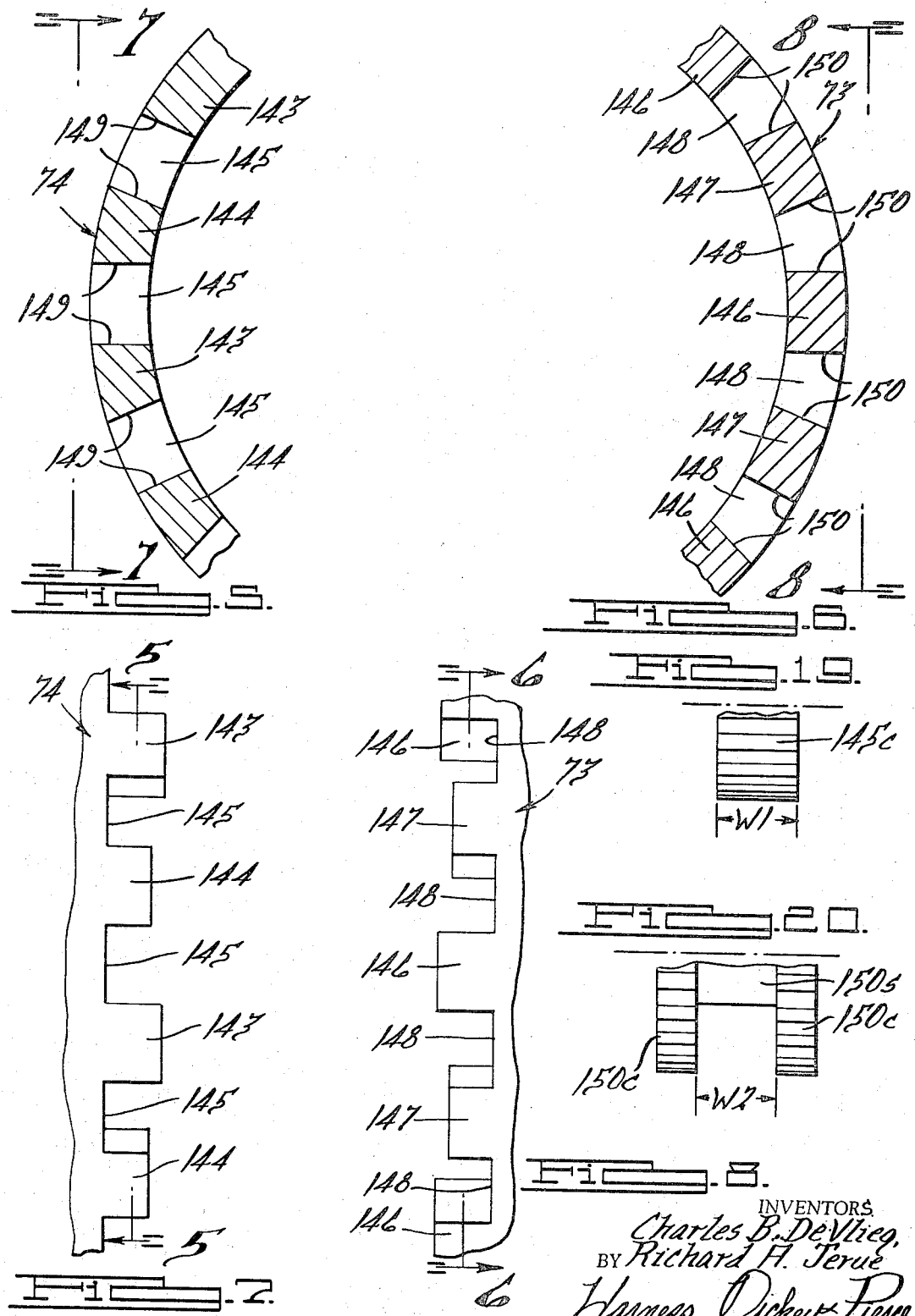

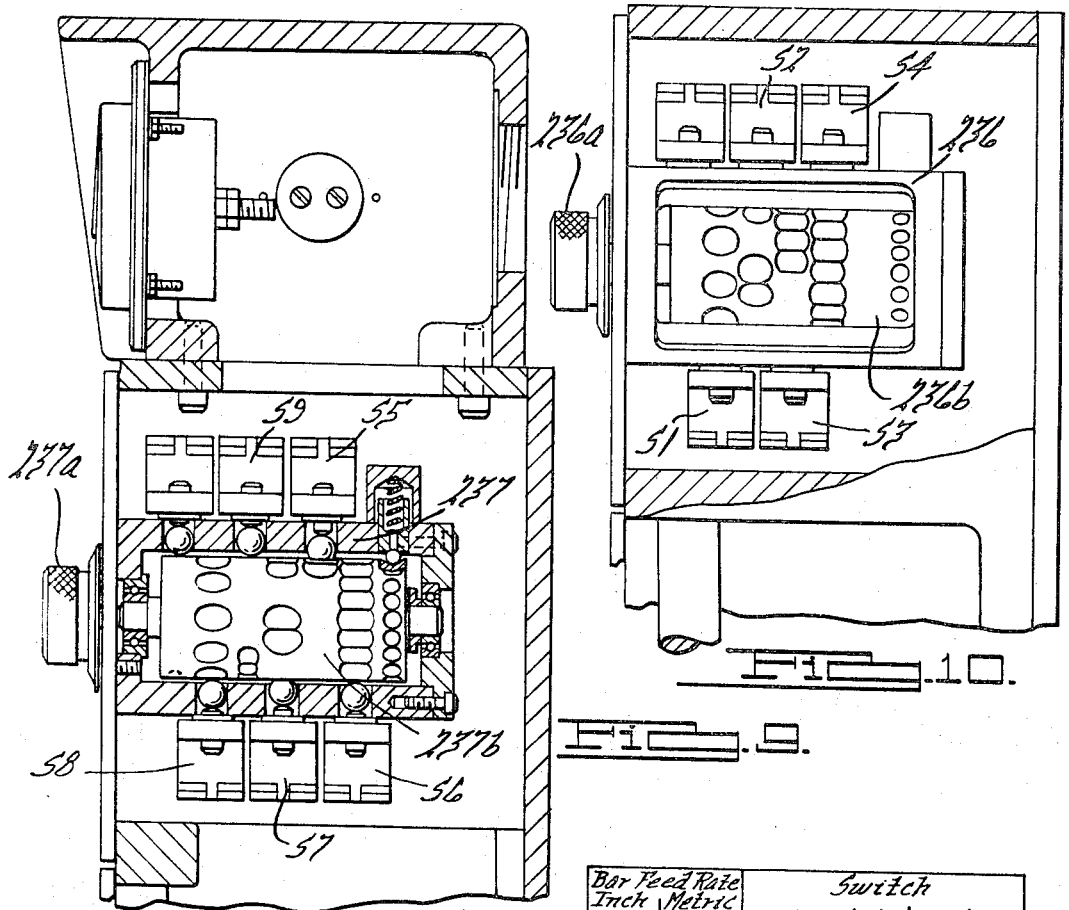

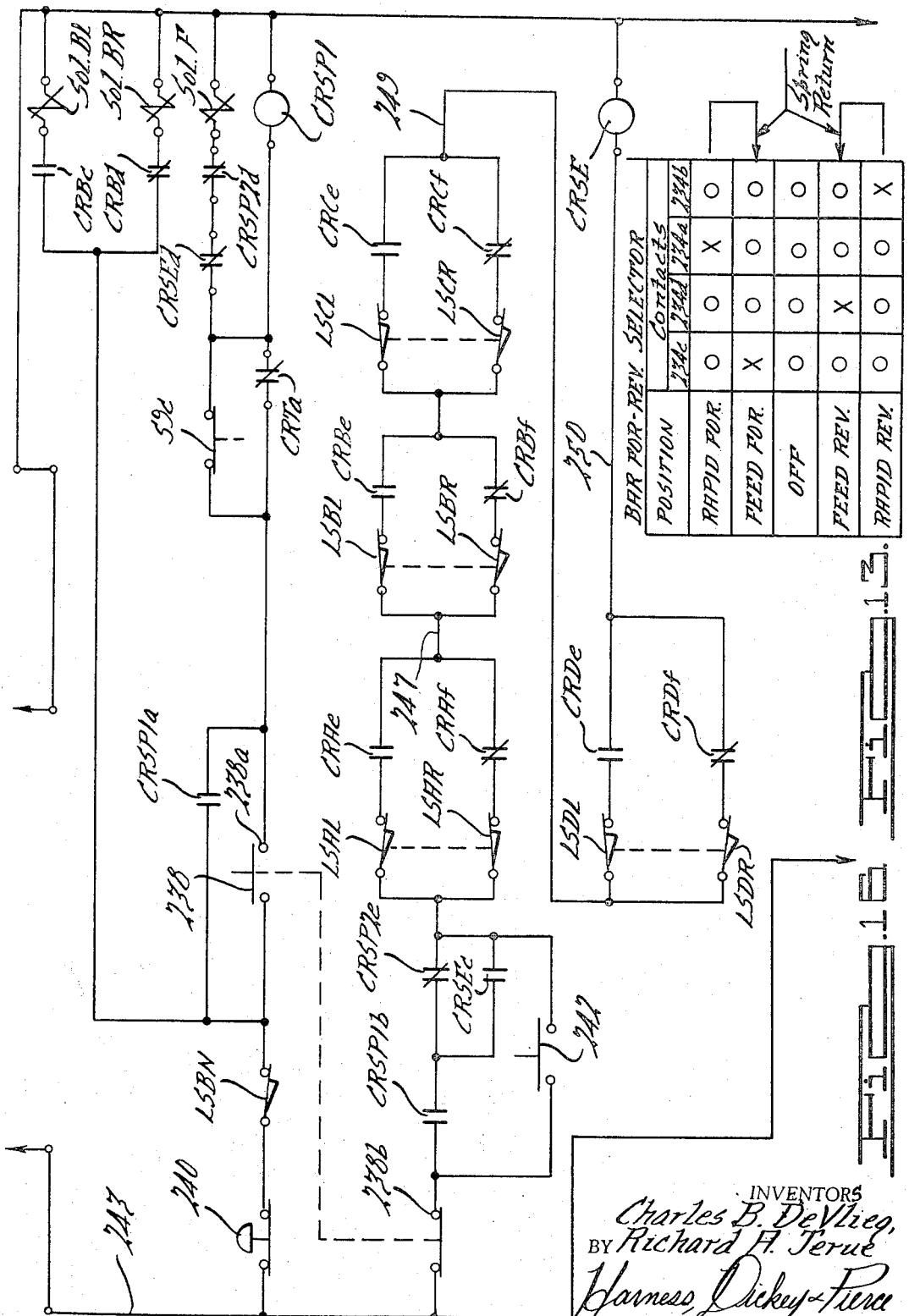

| FORW. - REV. SELECTOR | | | | |
|---|---|---|---|---|
| | FREE | | DEPRESSED | |
| | FORW. | REV. | FORW. | REV. |
| A | O | O | X | X |
| B | X | O | X | O |
| C | O | X | O | X |
| | — | — | — | — |

INVENTORS.
Charles B. DeVlieg,
BY Richard A. Jerue
Harness, Dickey & Pierce
ATTORNEYS.

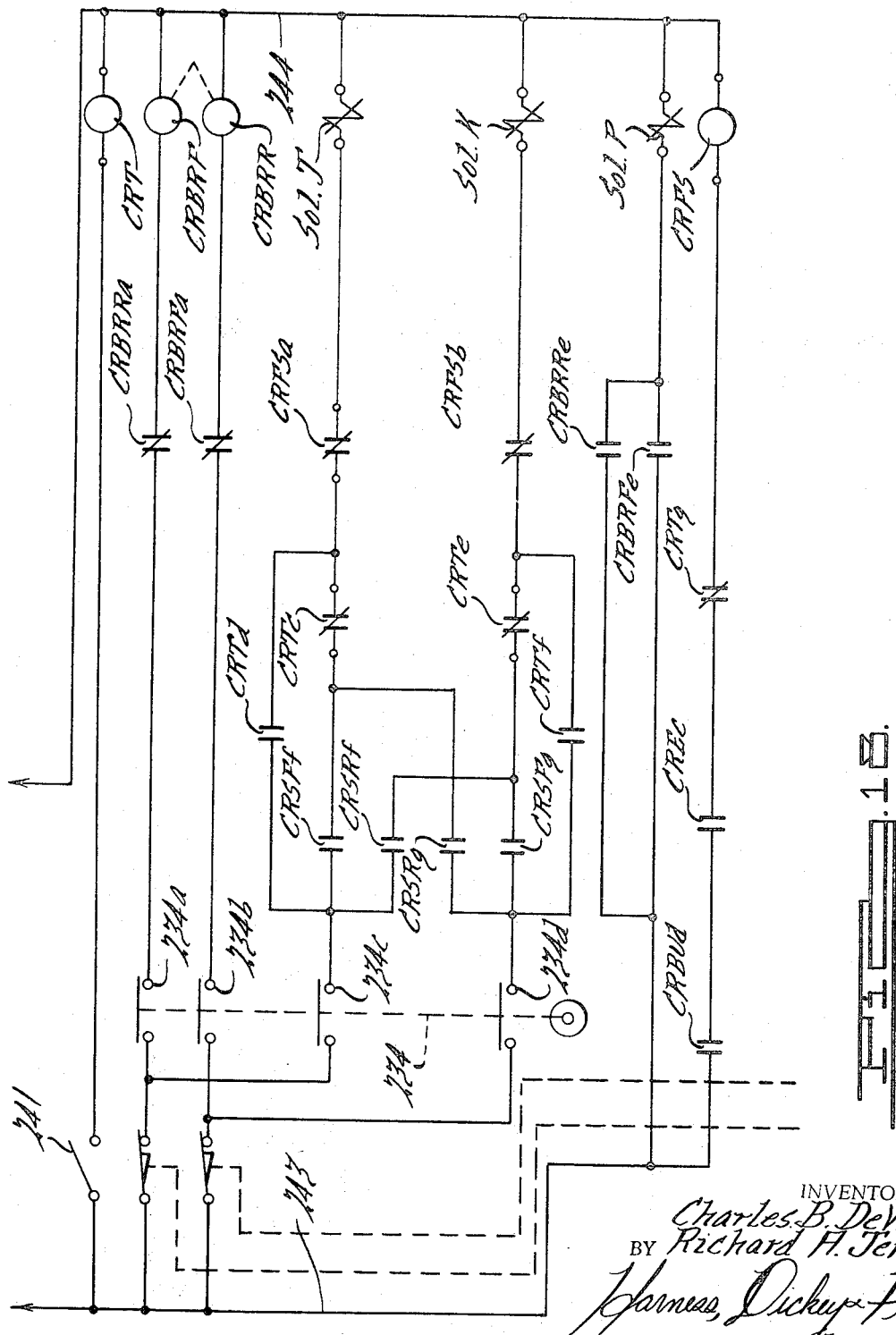

United States Patent Office 3,406,796
Patented Oct. 22, 1968

3,406,796
MACHINE TOOL SPINDLE FEED AND
DRIVE MECHANISM AND CONTROL
SYSTEM THEREFOR
Charles B. De Vlieg, Bloomfield Hills, and Richard A. Jerue, Birmingham, Mich., assignors to De Vlieg Machine Company, Royal Oak, Mich., a corporation of Michigan
Filed Dec. 15, 1966, Ser. No. 602,075
10 Claims. (Cl. 192—.084)

ABSTRACT OF THE DISCLOSURE

A machine tool spindle drive and feed mechanism in which the feed rates and drive speeds are remotely selected by the setting of electric switches or the use of other electrical signals from a source remote from the gears that transmit driving torque from a drive motor to the spindle. The drive speeds are obtained through the use of different gear trains and motor speeds. In order to change gears, novel dog clutches are utilized. These clutches are located so as to minimize heat and excessive drag and the operation of the clutches is accomplished with one clutch part stationary and the other part slowly rotated. The clutch positions are monitored to assure their proper engagement before the machine will operate. The controls prevent the selection of certain combinations and drive speeds and feed rates which are unsafe, and it is also possible to pre-program the machine for a new feed rate and drive speed without disturbing the feed and speeds being used in an operation in progress.

---

This invention relates to machine tools, and particularly to a feed and drive mechanism for the spindle of the machine tool and to a control system for such a mechanism. The spindle referred to is, of course, the spindle in which a cutting tool is supported and driven in rotation.

In boring and milling machines, as well as in various other machine tools, means are provided for the selection of the rate of rotation of the spindle. It is also customary to employ means for advancing the spindle along its axis of rotation. This latter function is called "feed." The selection of drive speeds and feed rates has traditionally been accomplished by the mechanical adjustment of a number of different gears, or the like, located in various parts of the machine. These manual adjustments are time consuming and awkward and they could not be accomplished in response to electrical information derived from tape or other logic of a numerical control system. It is therefore an object of the present invention to provide a spindle drive and feed mechanism for a machine tool in which the selection of feed rates and drive spindles can be made from a single readily accessible control panel or from another remote electrical source such as a numerical control device.

It is another object of the present invention to provide a machine tool spindle head construction having spindle feed and drive means in which the gearing for transmitting rotary motion to the spindle at a variety of different speeds is light in weight, compact in size, offers minimum drag on the motor, operates without producing excessive heat and is quiet in operation.

It is another object of the present invention to provide a spindle drive mechanism using novel dog clutches which engage in a positive manner and yet which are machined to very close dimensional tolerances which can be gauged in a precise yet inexpensive manner.

It is another object of the present invention to provide a spindle drive mechanism having shiftable clutch elements in which the positions of the clutch elements are mounted to prevent the operation of the machine and the transmission of driving torque to the spindle until all of the clutch elements are properly positioned and to utilize the sensing of the positioning of the clutch elements to initiate operation of the machine without lost time or without waiting for a preset time delay.

It is another object of the present invention to provide a spindle drive and feed mechanism and a control therefor which can be "set up" or programmed for the feed rates and drive spindles to be used during the next machining operation without interfering with the machining operation underway, or without actually beginning machining operation at the newly selected speed and feed rates until the machine is given a command to do so.

It is still another object of the present invention to provide a control for the drive and feed mechanism of a machine tool which is operable to prevent certain combinations of drive speeds and feed rates which would be unsafe for the type of machining to be accomplished.

It is a further object of the present invention to provide a spindle drive and feed mechanism and a control therefor which is reasonable in cost, reliable in performance, of rugged construction, fast and efficient in operation and which lends itself to the use of numerical control systems.

These and other objects of the present invention will become apparent from the following detailed description taken in conjunction with the accompanying drawings, wherein:

FIGURE 2 is an enlarged view of the spindle head of the machine tool illustrated in FIG. 1;

FIG. 3 is a diagrammatic view of various parts of the spindle head illustrated in FIG. 2, showing the mechanism by which the driving torque is transmitted to the spindle, and various controls therefor;

FIG. 4 is a diagrammatic view of various parts of the spindle head illustrated in FIG. 2, showing the mechanism by which feed movement of the spindle is accomplished, and various controls therefor;

Figures 13, 14:
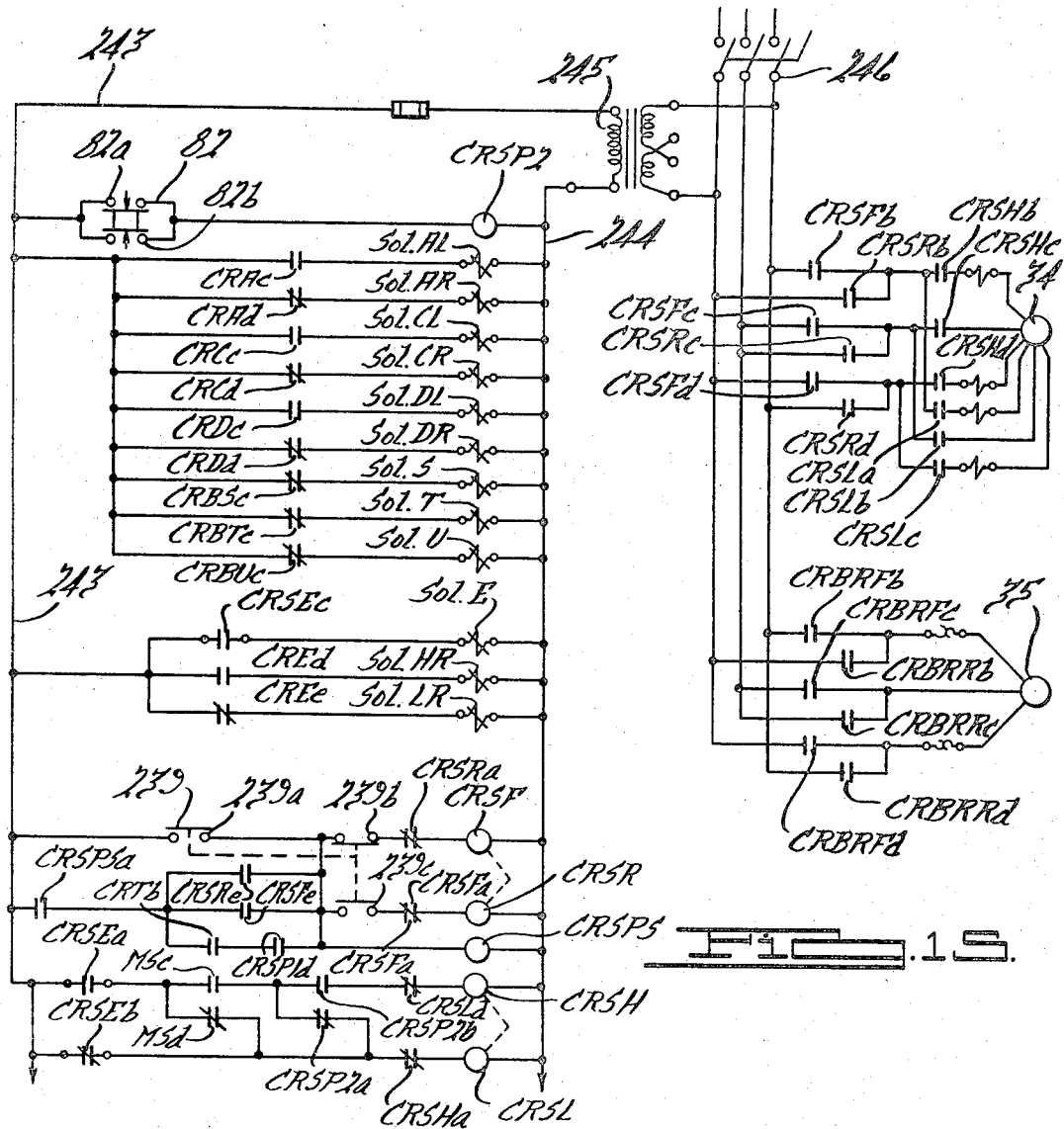
Figure 12:
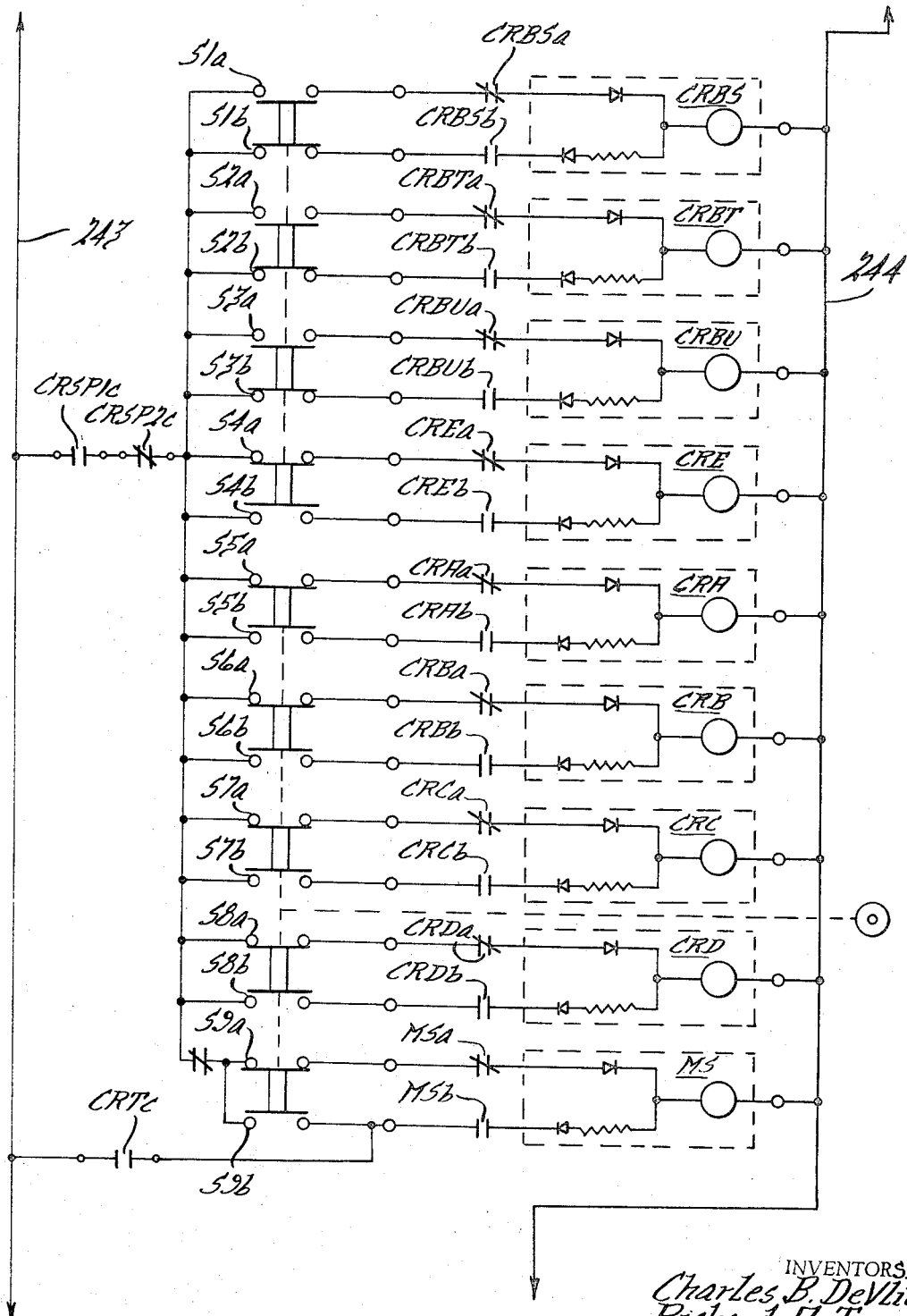

FIGS. 5 and 6 are enlarged sectional views of two engageable clutch elements utilized in the spindle drive mechanism of FIG. 3, the views being taken along the line 5—5 and 6—6 of FIGS. 7 and 8, respectively;

FIGS. 7 and 8 are views of the structure illustrated in FIGS. 5 and 6 taken along the lines 7—7 and 8—8 thereof, respectively;

FIGS. 9 and 10 are enlarged sectional views of the structure illustrated in FIG. 2 taken on the lines 9—9 and 10—10 thereof, respectively;

FIG. 11 is a chart showing the positions of the switches of the switch assembly 237 of FIG. 9 for the various spindle settings thereof;

FIG. 12 is a chart showing the positions of the switches of the switch assembly 236 of FIG. 10 for the various settings thereof;

FIG. 13 is a chart showing the positions of the contacts of the switch 234 of FIGS. 2, 4 and 18 for the various settings thereof;

FIG. 14 is a chart showing the positions of the contacts of the switch 239 of FIGS. 2 and 15 for the various settings thereof;

FIGS. 15, 16, 17 and 18 are wiring diagrams of the electrical control system for the structure illustrated in FIGS. 1–6, FIGS. 16, 17 and 18 being readable by placing each at the bottom of the numerically preceding figure; and FIGS. 19 and 20 are fragmentary views of miling cutters used to machine the teeth of the parts shown in FIGS. 5–9.

Figure 1:
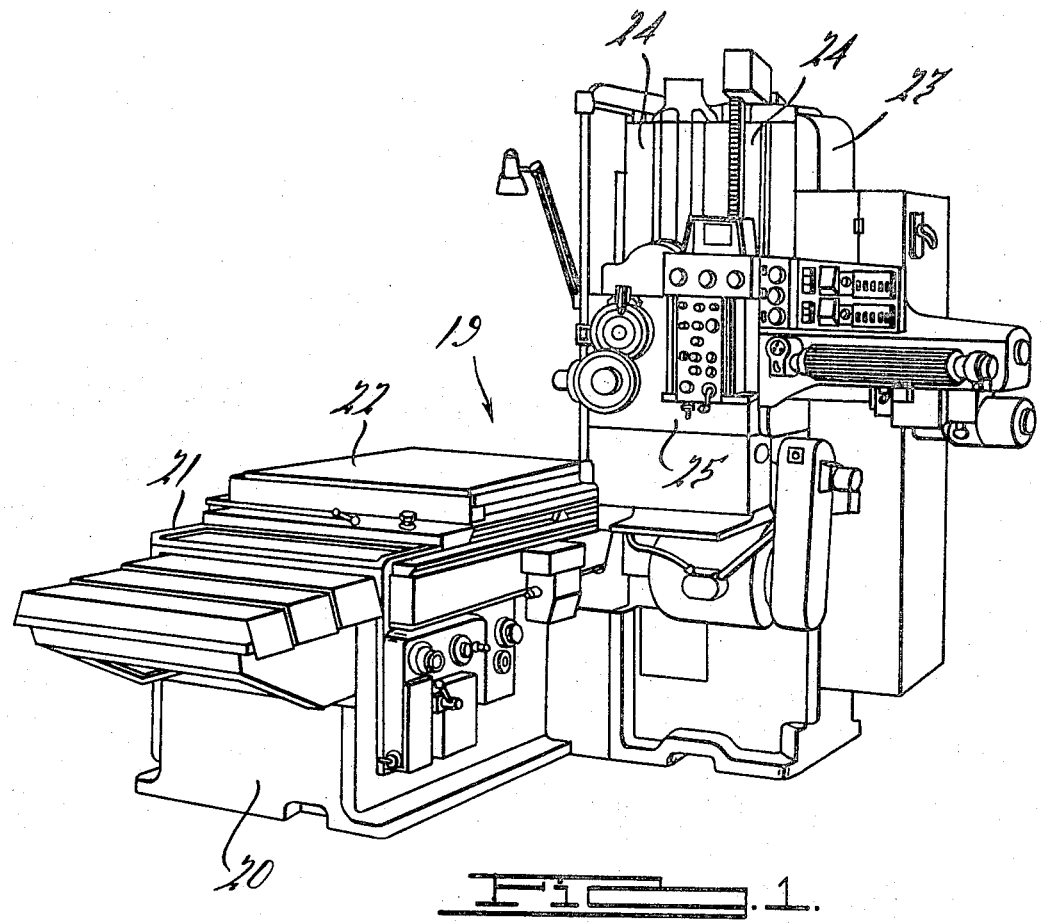
FIGURE 1 is an elevational view of machine tool embodying the principles of the present invention.

Referring now to FIG. 1, the invention is illustrated herein in the form of a horizontal boring and milling machine 19. The machine 19 has a bed 20 carrying a saddle 21 on which a work supporting table 22 is positioned. The bed 20 is integrally formed with a vertical column 23 having ways 24 supporting and guiding a spindle head housing 25 for vertical movement.

Turning now to FIG. 2, the spindle head housing 25 is shown as supporting a spindle sleeve 26 by means of bearings 27 and 28. The spindle sleeve 26 is rotatable within the bearings 27 and 28 and is fitted internally with an elongated spindle bar 29. The spindle bar 29 is keyed to the spindle sleeve 26 for co-rotation therewith but is axially movable within the spindle sleeve 26. It will be seen that the bearings 27 and 28 axially fix the position of spindle sleeve 26 relative to the housing 25. Sleeve bearings 30 and 31 are interposed between the spindle bar 29 and the spindle sleeve 26 to enhance the axial sliding movement of the spindle bar 29 in the spindle sleeve 26. As will be readily apparent to those familiar with machine tools, the spindle bar 29 serves to receive and support the cutting tool (not shown) with which a workpiece (not shown) supported on the table 22 is to be machined.

Control panels 32 and 33 are positioned on the side of the housing 25 in a position readily accessible to a machine tool operator. The various controls necessary for selecting the feed rates and drive speeds are positioned on the panels 32 and 33 as well as various other controls for the machine 19. It will be understood, however, that the present invention concerns itself only with the speed and drive mechanisms and the controls therefor and, accordingly, the remaining controls and switches mounted on the panels 32 and 33 will not be discussed.

Power for producing rotation of the spindle bar 29 is obtained from a drive motor 34 hung from the housing 25. Motive power for producing feed movement of the spindle bar 29 is derived alternatively from either the drive motor 34 or from a rapid feed motor 35 supported on a spindle housing extension member 36 bolted to the back side of the spindle housing 25.

Turning now to FIG. 4, it will be seen that the rear end of the spindle bar 29 is rotatably supported within a spindle thrust housing 37 enclosed within the extension member 36 and slidably carried on a pair of rigid bars or ways 38. The spindle thrust housing 37 includes an internally threaded nut portion 39 which is engageable with a bar feed lead screw 40 journaled within the extension member 39. Rotation of the bar feed lead screw 40 produces movement of the spindle thrust housing parallel thereto and consequent axial movement of the spindle bar 29 within the sleeve 26. FIG. 4 shows a tool locking screw 41 journaled within the spindle bar 29, but the tool locking screw 29 forms no part of the present invention.

Referring now to FIG. 3, the mechanism by which rotary motion is transmitted from the motor 34 to the spindle sleeve 26 is illustrated. The motor 34 drives a shaft 42 through belts 43. The shaft 42, as well as the other shafts shown in FIGS. 3 and 4 are journaled in the spindle head housing 25. The shaft 42 passes through a spindle drive clutch 44, a sleeve 45 and a drag brake 46. The end of the shaft 42 opposite from the belts 43 is joined to one-half of a creeper drive clutch 47. The clutches 44 and 47 and the brake 46 are substantially identical in construction, all of said devices being hydraulically actuated multiple disk clutches of the type, for example, which is made by E. C. Styberg Engineering Company of Racine, Wisconsin. The spindle drive clutch 44 serves to driveably connect the shaft 42 to the sleeve 45 with which it is coaxial, while the brake 46 merely serves to apply a yieldable drag or load to the sleeve 45 when it is energized. The clutch 47 serves to co-rotatably couple the shaft 42 to another shaft 48 coaxial therewith. The shaft 48 is driveably connected to a shaft 49 through bevel gears 50. A worm 51 is fastened to the end of the shaft 49 and driveably engages a worm gear 52 fastened to one-half of a hydraulically actuated multiple plate clutch 53 which function as a spindle brake. The other half of the clutch or brake 53 is coupled to a shaft 54 on which a spur gear 55 is freely rotatable. When the clutch 53 is energized by the delivery of hydraulic fluid thereto, it couples the shaft 54 to the worm gear 52 in order to produce a low speed rotation of the shaft 54 in response to rotation of the shaft 49, or to prevent rotation of the shaft 54 if the shaft 49 is stationary. As is well known, a worm and worm gear are capable of transmitting rotation in only one direction: from the worm to the worm gear. Accordingly, when the shaft 49 is stationary the worm gear 52 cannot turn. This braking action is utilized to arrest spindle rotation.

The spur gear 55 on the shaft 54 meshes with a spur gear 56 fixed on a shaft 57 on which a spur gear 58 is freely rotatable. The spur gear 58 meshes with a spur gear 59 formed integrally on the sleeve 45. A spur gear 60 is also integrally formed on the sleeve 45 and meshes with a spur gear 61 freely rotatable on the shaft 57. The gears 58 and 61 have toothed dog clutch portions 62 and 63, respectively, integrally formed therewith for mating engagement with the opposite sides of a clutch member 64 that is splined on the shaft 57 and is axially slidable between positions in which it is alternately engageable with either the clutch portion 62 or the clutch portion 63. The clutch member 64 is provided with an annular peripheral groove 65 which registers with a shifter fork 66 carried by a piston rod 67 of a piston 68 and by means of which clutch 64 is shifted axially on the shaft 57. The piston 68 is operated by fluid pressure within a hydraulic cylinder 69. By shifting of the clutch 64, a selection may be made to drive the shaft 57 through the gears 58 and 59 or through the gears 60 and 61. It will be seen that the size of such gears is different in order to produce a different speed of rotation of the shaft 57.

Two alternative paths for the delivery of torque or rotary motion from the shaft 57 to the shaft 54 are available. One of such paths is through the gears 55 and 56, while the other of such paths is through a spur gear 71, fastened on the right-hand end of the shaft 57, and a spur gear 72 meshing with the spur gear 71 freely rotatable on an enlarged diameter portion 70 of the shaft 54. It should be noted, however, that the shaft portion 70 is integrally formed with and is co-rotatable with the shaft 54. The gear 72 has a toothed dog clutch portion 73 formed integrally therewith which is engageable with a clutch member 74 splined on the shaft portion 70. Another clutch member 75 is also splined on the shaft portion 70 and is engageable with a dog tooth clutch portion 76 integrally formed with a spur gear 55. The spacing between the clutch elements 74 and 75 is such that only one of such clutch members is in engagement with its meshing clutch portion at the same time. Axial shifting movement of the clutch members 74 and 75 is accomplished by a pair of shifter forks 77 and 78 carried by a piston rod 79 of a piston 80. The piston 80 is operated by fluid pressure within a fluid cylinder 81. Fixed to one end of the shaft 70 is the armature of a plugging switch 82. The plugging switch 82 comprises means for electrically detecting rotation of the shaft portion 70 when it is rotating at a speed in excess of a preselected rate. Such plugging switches are made, for example, by the Allen-Bradley Company of Milwaukee, Wis., and are illustrated in their Bulletin 808. The contacts of the plugging switch are caused to open and close by a magnetic coupling action.

Rotation of the shaft portion 70 serves to drive a spur gear 83 which is fixed thereto and to cause rotation of a spur gear 84 with which the gear 83 meshes. The spur gear 84 is fixed on a shaft 85 as is another spur gear 85a. The spur gears 84 and 85a mesh with spur gears 87 and 88, respectively, which are freely rotatable on a shaft 89. The spur gears 87 and 88 can be alternatively coupled to the shaft 89 by the shifting of a clutch member 86 splined on the shaft 89 and selectively engageable with clutch portions 90 and 91 formed integrally with the spur gears 88 and 87, respectively. The clutch member 86 is shifted axially on the shaft 89 by a shifter fork 92 carried by a piston rod 93 of a piston 94. The piston 94 is actuated by the delivery of hydraulic fluid to a cylinder 95 in which it is located.

Rotation of the shaft 89 is transmitted to a spur gear 98 which is splined to the shaft 89. A spur gear 96 is freely rotatable on the shaft 89 and meshes with a gear 99 integrally formed on the spindle sleeve 26. The sleeve 26 can be driven through the gear 96 by the engagement of a toothed dog clutch portion 100 formed on the gear 98 which is splined to the shaft 89. A spur gear 96 is formed on the gear 96. However, the gear 98 is shiftable to a position in which the clutch portions 100 and 101 are disengaged and the teeth of the spur gear 98 are caused to mesh with a gear 102 formed integrally on the spindle sleeve 26. Shifting of the gear 98 is accomplished by shifter fork 103 which registers with an annular peripheral groove 104 formed on gear member 98. The shifter fork 103 is actuated by a piston rod 105 of a piston 106 disposed in a fluid cylinder 107.

FIGURE 3 also illustrates the hydraulic circuitry for controlling the operation of the various clutches. This circuitry includes a hydraulic fluid pressure source 108 which is connected by conduits 109 and 110 to a pair of valves 111 and 112, respectively. The valve 111 is operated by a pair of solenoids Sol. AR and Sol. Al. The valve 112 is operated by a pair of solenoids, Sol. DR and Sol. DL. The fluid pressure source 108 also has a direct connection to a hydraulic valve 113 which is controlled by a solenoid, Sol. E. In the normal position of the valve 113, fluid is free to flow therethrough to a conduit 114 and through a pressure relief valve 115 to a conduit 116 leading to a hydraulic valve 117. The valve 117 is operated by a solenoid, Sol. F, which, upon its energization, will direct fluid through a conduit 118 leading to the creeper drive clutch 47 and drag brake 46. The conduit 114 has a branch connection to a conduit 119 leading to the spindle drive brake 53. A fluid accumulator 120 is positioned in the conduit 119 to provide instantaneous and ample supply of fluid pressure. Upon energization of the solenoid Sol. E, fluid under pressure will be delivered through the valve 113 to a conduit 121 to the clutch 44. It will be seen that an accumulator 122 is positioned within the line 121 to provide an instantaneous, ample supply of hydraulic pressure when it is needed. The valve 111 is operable to deliver fluid alternatively to a pair of conduits 123 and 124 leading to the opposite ends of the hydraulic cylinder 107. Similarly, the valve 112 is operable to deliver hydraulic fluid alternatively through a pair of conduits 125 and 126 leading to the opposite ends of the hydraulic cylinder 69.

Upon actuation of one of a pair of solenoids, Sol. BR or Sol. BL, a valve 127 will be operable to deliver hydraulic fluid from the conduit 110 to a selected one of a pair of conduits 128 and 129 leading to the opposite ends of the hydraulic cylinder 95. It will be noted that a fluid reservoir 130 is provided for the return flow of hydraulic fluid from the various valves. For example, a conduit 131 is provided for the return flow of fluid from the valve 111, while a conduit 132 is provided for the return flow of fluid from the valve 117 to the reservoir 130. A conduit 133 is provided with a return flow of fluid from the valve 113. Conduits 134 and 136 are provided for the return flow of fluid from the valves 127 and 112. A conduit 135 is provided for return flow of fluid from a valve 137 controlled by solenoids, Sol. CR and Sol. CL. The valve 137 controls the delivery of fluid pressure through a pair of conduits 138 and 139 leading to the opposite ends of the hydraulic cylinder 81. The conduit 110 supplies fluid pressure to the valves 112, 137 and 127 through branch conduits 138a, 138b, and 138c.

As may be seen in FIGURE 3, various limit switches are provided for monitoring the positions of the clutch members 98, 86, 75 and 74 and 64. Limit switches LSAL and LSAR monitor the position of the clutch 98, limit switches LSBL and LSBR monitor the position of the clutch 86, limit switches LSCL and LSCR monitor the position of the clutches 74 and 75, and limit switches LSDL and LSDR monitor the position of the clutch 64. The limit switches LSAL and LSAR are both engageable by the piston rod 105. The contacts of LSAL are normally open and the contacts of LSAR are normally closed. In the position illustrated in FIG. 3, with piston 106 at the right-hand end of cylinder 107, the piston rod 105 is out of contact with both of said limit switches. All of the rest of the aforesaid limit switches have normally closed contacts. All of these limit switches are provided with rollers that roll along the adjacent piston rods to hold the contacts thereof in an open condition.

The piston rod 93 has a reduced diameter portion 140 and when the actuating arm of either of the limit switches LSBL or LSBR registers with the reduced diameter portion 140 the contacts of said limit switches will be permitted to close. Similarly, the piston rod 79 is provided with a reduced diameter portion 141 and the piston rod 67 has a reduced diameter portion 142, said reduced diameter portions providing a clearance space for the limit switches associated with said piston rods which permits the contacts of a limit switch to open when the actuating arm of the limit switch registers therewith. A hand operated cam 93c is provided to hold the piston rod 93 in a position with both of the limit switches LSBL and LSBR out of registry with the portion 140 and with the piston 94 centered in the cylinder 95.

The construction of the teeth of the various dog tooth clutch members and clutch portions utilized in the drive train for the spindle sleeve 26 have an unusual shape which is illustrated in detail in FIGS. 7 through 10. It may be assumed, for example, that FIG. 9 represents an enlarged fragmentary view of the clutch member 74, while FIG. 10 represents an enlarged fragmentary view of the cslutch portion 73. It will be appreciated, however, that the shapes of the teeth of the clutch member 74 and clutch portion 73 are the same as the shape of each of the interfitting pairs of toothed clutch members and portions shown in FIG. 3. Looking at FIG. 7 it will be seen that the clutch member 74 has a plurality of axially extending high teeth 143 and low teeth 144. The high and low teeth 143 and 144 alternate and each tooth is spaced from the teeth on either side thereof by grooves or spaces 145. The grooves 145 or teeth 143 and 144 are arranged annularly and are concentric about the axis of rotation. The clutch portion 73 has alternating high teeth 146 and low teeth 147 spaced by spaces or grooves 148 having opposite side walls 150 that converge radially inwardly. Each tooth 146 and 147 has parallel opposite side walls.

As shown in FIG. 5, the grooves 145 are defined on their opposite sides by parallel side walls 149 of the teeth 143 and 144. In the manufacture of the clutch member 74, each groove 149 is formed by making a single pass with a milling cutter 149c (FIG. 19) having a width W1 equal to the spacing between the side walls 149. In making this pass, the milling cutter is moved in a radial direction.

In the machining of the workpiece to manufacture the clutch portion 73, each tooth, 146 and 147, is formed on its sides by making a single pass with a tool (FIG. 20) having two cutter 150C spaced apart by a spacer 150S having a width W2 equal to the spacing between the walls 150 on the opposite sides of a tooth 146 or 147. Each of the milling cutters 150C is of a width less than the width of the grooves 148, but of sufficient width that the overlapping cuts made to form an adjacent pair of teeth 146 and 147 will completely form a groove 148 therebetween. W2 is just slightly less than W1 to provide a close fit between the teeth. From the foregoing it will be seen that the teeth of one of the interfitting clutch members or portions are provided with parallel side walls whereas the grooves of the other clutch member or portion are provided with paallel side walls. By this means each of the teeth of the interfitting clutch members or portions may be very conveniently machined. Furthermore, the width of the teeth may be very accurately gauged by conventional gauging instruments and the spacing of the teeth and grooves may be very accurately controlled to insure the precise interfitting relation of the clutch elements without undue play.

The alternate high and low tooth arrangement of the clutch member 74 and clutch portion 73 is also significant. When one clutch member or portion is biased axially toward its mate with one clutch member being stationary and the other slowly rotated, relative angular movement between the two clutch elements will be arrested by the engagement of the sides of the high teeth 143 with the sides of the high teeth 146. Should the outer ends of the high teeth 143 and 146 abut one another as the clutch elements are biased together, it will be noted that further axial movement will be possible as soon as the high teeth 143 and 146 pass out of angular registry with one another. The engagement of the sides of the high teeth 143 and 146 creates a momentary dwell wherein the teeth 143 and 144 of the clutch element 74 will align with the grooves 148 of the clutch 73 to permit the clutch member 74 to be biased into engagement with the clutch portion 73. Were it not for this fact, the angular speed of rotation of the clutch member 74 relative to the clutch member 73 might carry the teeth of the clutch member 74 past the grooves with which they are intended to align before the teeth of the clutch member 74 could be depressed into the grooves 148 of the clutch portion 73. This possibility is, however, avoided by the alternate high and low tooth arrangement of the clutch elements.

Turning now to FIG. 4, the mechanism by which feed movement is transmitted to the spindle bar 29 is illustrated. It will be apparent that such feed movement is accomplished by producing rotation of the lead screw 40. This rotation may be accomplished by the use of either of two motors: the bar rapid motor 35 or the spindle drive motor 34. The path for producing rotation of the lead screw 40 by the use of the bar rapid motor 35 is quite obvious. This path will be seen to include a drive shaft 35d of the motor 35, a hydraulically actuated multiple disk clutch 151, a spur gear 152 which is adapted to be coupled to the shaft 35d by the clutch 151, a spur gear 153 meshing with the spur gear 152, a shaft 154 to which the spur gear 153 is fixed, a spur gear 155 fastened on the shaft 154, a spur gear 156 meshing with the spur gear 155, an a spur gear 157 keyed to the lead screw 40 and meshing with the spur gear 156. It will be noted that the spur gear 156 is fastened to a shaft 160 which passes through a bar feed forward drive clutch 161 and a bar feed reverse drive clutch 162. Manual rotation of the shaft 160 and lead screw 40 can be produced by operation of a handle 166a which produces rotation of a shaft 166b, gears 166c, 166, and 167 and a shaft 168 driveably connected to the shaft 160 by bevel gears 169. The clutches 161 and 162 are both of the hydraulically actuated multiple disk type and each has one-half thereof connected to the shaft 160. The other half of the clutch member 162 is connected to a bevel gear 163 while the other half of the clutch 161 is connected to a bevel gear 164. The bevel gears 163 and 164 mesh on opposite sides of a bevel gear 165 fastened to the end of a shaft 166. The shaft 160 will be rotated in opposite directions depending upon whether it is driven in rotation through the bevel gear 163 or 164. Which of the bevel gears 163, 164 will be utilized depends on which of the clutches 161, 162 is energized. It is noted that the clutches 161 and 162 are both energized through a valve 170 which assures that only one of the clutches 161 or 162 may be energized at the same time. Rotation of the shaft 166 is produced by the spindle drive motor 34 by taking power off of the spindle sleeve 29 through a spur gear 171 fastened thereon. The various paths through which power is transmitted from the spur gear 171 to the shaft 166 provide a variety of different speeds of rotation for the shaft 166 relative to the speed of rotation of the spindle sleeve 26.

It will be seen that the spur gear 171 meshes with a spur gear 172 fastened to a shaft 173 having a spur gear 174 fastened to its opposite ends. The spur gear 174 meshes with a gear 175 fastened to a shaft 176 also having gears 177 and 178 fastened thereto. The gears 177 and 178 mesh with gears 179 and 180, respectively, which are freely rotatable on a shaft 181 and are disposed in spaced-apart relation. A toothed dog clutch member 182 is spline dto the shaft 181 and is axially shiftable on the shaft 181 between positions in which it engages toothed dog clutch portions of the gears 179 and 180 to select which of said gears will be utilized to drive the shaft 181. Rotation of the shaft 181 produces rotation of a pair of gears 183 and 184, both fastened on the shaft 181. The gears 183 and 184 mesh with gears 185 and 186, respectively, which are freely rotatable on a shaft 187 and are spaced apart thereon with a toothed dog clutch element 188 interposed therebetween. The clutch member 188 is splined on the shaft 187 and by the axial movement thereof its teeth may be brought in engagement with clutch teeth of either of the spur gears 185 and 186 to select which of said gears will be utilized to drive the shaft 187 in rotation. Rotation of the shaft 187 produces rotation of a pair of spur gears 189 and 190, both fastened to the shaft 187. The gears 189 and 190 mesh with gears 191 and 192 which are freely rotatable on a shaft 193. A dog tooth clutch member 194 is splined on the shaft 193 between gears 191 and 192 and has dog clutch teeth on opposite sides thereof which will engage dog clutch teeth on either the gear 191 or the gear 192 depending on the shifting of the clutch member 194. Shaft 193 has a worm 195 formed thereon that meshes with a worm gear 196 fastened to the end of the shaft 166. The shaft 193 is operable to drive a shaft 199 through meshing bevel gears 198. The shaft 199 has a spur gear 200 fastened thereto which meshes with a gear 201 freely rotatable on the shaft 166. A clutch element 202 is fixed on the shaft 197 and is engageable with a dog tooth clutch member 203 splined on the shaft 166 and shiftable between positions in which it alternatively engages dog teeth of the gear 201 of the clutch member 202. Accordingly, the shaft 166 can be driven either through the shaft 197 or the shaft 199.

Clutch members 203, 182, 188 and 194 are each provided with annular peripheral grooves for the reception of shifter forks 204, 205, 206 and 207, respectively. Shifter fork 204 is actuated by a piston 208 disposed in a hydraulic cylinder 209. Shifter fork 205 is operated by a piston 210 disposed in a hydraulic cylinder 211. The shifter 206 is operated by a piston 212 disposed within a hydraulic cylinder 213 and the shifter 207 is operated by a piston 214 disposed in a hydraulic cylinder 215. The ends of the hydraulic cylinder 209 are connected to a hydraulic valve 216 through a pair of conduits 217 and 218. The hydraulic valve 216 is operated by a pair of solenoids Sol. LR and Sol. HR. Depending upon which of the solenoids Sol. LR or Sol. HR is actuated, hydraulic fluid will be delivered from the valve 216 to one end of the hydraulic cylinder 209. It will be noted that the hydraulic valve 216 is connected to a conduit 219 joined to a conduit 220 leading to the hydraulic pressure source 108.

The opposite ends of the hydraulic cylinder 211 are connected to a hydraulic valve 221 through a pair of conduits 222 and 223. The valve 221 is operated by a solenoid Sol S. The opposite ends of the hydraulic cylinder 215 are connected by conduits 224 and 225 to a hydraulic valve 226 that is operated by a solenoid Sol. U. The opposite ends of hydraulic cylinder 213 are connected through conduits 227 and 228 to a hydraulic valve 229 that is operated by a solenoid Sol. T. Each of the hydraulic valves 221, 226 and 227 is supplied with hydraulic fluid under pressure from the conduit 220.

The hydraulic pressure supply source 108 also delivers fluid through a conduit 230 leading to a hydraulic valve 231 which is operable to deliver fluid either through a conduit 232 to the rapid clutch 151 or through a conduit 233 to the hydraulic valve 170. The hydraulic valve 231 is operated by a solenoid Sol. P and the arrangement is such that when the bar rapid clutch 151 is actuated by the valve 231, fluid cannot be supplied to the valve 170 and vice versa. It will be seen that the valve 170 is operated by a pair of solenoids, Sol. J and Sol. K.

A pair of limit switches LS 17 and LS 27 (FIG. 4) are positioned to have their contacts open when the spindle bar thrust housing 37 reaches the extreme limits of its movement.

The various controls for operating the mechanism of the present invention include a bar feed selector switch 234 having a control handle 235 that can be moved to five different positions. The position designated zero (FIG. 4) is the neutral position in which the motor 35 is not energized and neither is the mechanism actuated to produce feed rotation of the lead screw 40 from the drive motor 34. When the handle 235 is actuated to the positions 1 and 2, it will produce low speed rotation of the lead screw 40 in either a forward or reverse direction, while when the handle 235 is moved to the positions indicated as 3 and 4, rotation of the lead screw 40 is produced through energization of the bar rapid motor 35 in either the forward or reverse direction. The condition of the various contacts of the switch 234 to accomplish the foregoing is indicated in the chart of FIG. 13.

Other manually operated controls of the control system of the present invention include a feed rate selector switch assembly 236 and a spindle drive speed selector switch assembly 237. The switch assemly 236 includes switches S1, S2, S3, and S4, and the switch assembly 237 includes switches S5, S6, S7, S8 and S9. The normally open or closed condition of the contacts of these switches is shown in FIG. 17 and FIG. 16. FIGS. 11 and 12 indicate by their "O" designation which switches are biased out of their normal condition in order to produce the various spindle speeds and feed rates shown therein.

Other manually operable controls include a spindle start switch 238, a spindle direction selector switch 239, a spindle stop switch 240, and a machine function selector switch 241. The machine function selector switch can be set to either a tapping position or a boring position. If the machine is to be used for the purpose of tapping a hole, the selection of the tapping position is made; whereas if the machine is to be used for boring, drilling or similar operations, the boring setting is selected. A "Jog" switch 242 is also provided for momentarily causing a feed movement of the spindle bar 29. It will be apparent that a variety of other controls are provided on the machine. For example, means may be provided to select between the controls illustrated herein and the use of electrical information derived from a tape control or the like (not shown), which feeds electrical information to the circuitry in the same manner that such information is fed to the circuitry by the setting of the switches 236 and 237.

*Operation*

In the operation of the machine of the present invention, a number of selections are made on the control panels 32 and 33 before a machining operation is begun. First, the feed rates and spindle drive speeds are selected by rotation of the knobs 236a and 237a of the switch assemblies 236 and 237, respectively. As may be seen in FIG. 9 and 10, the switch assemblies 236 and 237 have cam portions 236b and 237b. The cam portion 236b has spaced relieved areas, which, depending upon the angular adjustment thereof, permit movement of one or more of the actuating arms of switches S1, S2, S3, and S4. These switches have contacts S1a, S1b, S2a, S2b, S3a, S3b, S4a and S4b, which indirectly control the operation of the solenoids Sol. S, Sol. T, Sol. U, Sol. HR and Sol. LR in a manner which will be explained. The cam portion 237b of the switch assembly 237 has relieved areas which, depending upon the angular setting thereof, permit movement of the actuating arms of one or more switches S5, S6, S7, S8 and S9. These switches have contacts S5a, S5b, S6a, S6b, S7a, S7b, S8a, S8b, S9a, S9b, (FIG. 17) which indirectly control the operation of solenoids Sol. AL, Sol. AR, Sol. BL, Sol. BR, Sol. CL, Sol. CR, Sol. DL, Sol. DR, as well as a pair of solenoids Sol. SH and Sol. SL. The switch S9 also has contacts S9c (FIG. 16) which perform an interlock or safety function, as will be explained. The contacts of each switch S1 through S9 are interlocked so that when the "a" contacts are open the "b" contacts are closed and vice versa.

The energization of the various solenoids mentioned above is accomopilshed through the energization of a plurality of latching relays CRBS, CRBT, CRBU, CRBE, CRE, CRA, CRB, CRC, CRD and MS. These latching relays are of the permanent magnet type as, for example, the type known as "Bulletin 702 PM A.C. Contacters" made by the Allen-Bradley Company of Milwaukee, Wis.

These latching relays are of the type in which the field winding does not require continuous energization in order to prohibit the contacts thereof from returning to their "normal" position. It will be noted that two separate flow paths are provided for the energization of each of said latching relays: one being through the "a" contacts of the switches S1 through S9 and the other being through the "b" contacts of the switches S1 through S9. When the latching relays are energized through the circuit including the "a" contacts, the latching relay may be said to be "latched" and only a momentary current through the "a" contact circuit is required to latch the latching relays. The contacts of a "latched" latching relay are only returned to a "released" position when the current to the latching relays is supplied through a circuit including the "b" contacts of the switches S1 through S9.

It will be seen that the latching relays have normally closed contacts CRBSa, CRBTa, CRBUa, CRAa, CRBa, CRCa, CRDa, CREa and MSa, which will open as soon as their relays are latched to interrupt the latching circuit which only needed to draw current for a moment in order to accomplish the latching function. The latching relays also have normally open contacts CRBTb, CRBUb, CREb, CRAb, CRBb, CRCb, CRDb, MSb. When the latching relays are unlatched or "released" through their "release" circuit including their "b" contacts, the aforesaid normally open "b" contacts will thereafter open to prevent continued energization of the field windings of said relays. It will, of course, be appreciated that when one of the latching relays is latched, the closing of its "b" contacts prepares the releasing circuit for use in releasing that latching relay. Similarly, the unlatching of one of the latching relays, which permits the "a" contacts of that latching relay to reclose and prepare the circuit for the latching of that relay in response to a subsequent command. The energization of the relays CRBS, CRBT, CRBU, CRE, CRA, CRB, CRC, CRD and MS occurs between a pair of conductors 243 and 244. An alternating current potential is produced between the conductors 243 and 244 by a transformer 245 which receives power from a power source 246.

Another initial setting that should be made is the setting of the boring-tapping selection switch 241. If a boring operation is to be performed, the switch 241 is turned to open its contacts. This will serve to prevent the use of certain high feed rates, as will be explained. If a tapping operation is to be performed, the switch 241 is turned to close its contacts and energize relay CRT, which opens its contacts CRTa (FIG. 16). This prevents the energization of relay CRSP1 when the speed selector switch assembly is set for any speed in excess of 249 revolutions per minute (see FIG. 11). This results from the fact that contacts S9c will also be open at any such high spindle speed.

Next, the direction of rotation of the motor 34 is selected by turning the switch 239. Turning the switch 239 only operates contacts 239b and 239c. By depressing the operating button of the switch 239, the contacts 239a are closed to perform a "motor" start function. This will energize either relay CRSF or relay CRSR and also the relay CRSPS. If relay CRSF is energized it will open its contacts CRSFa and if relay CRSR is energized it will open its contacts CRSRa. Contacts CRSPSa will close to establish an energizing circuit for CRSPS and CRSF or CRSR after switch 239 is released and contacts 239a open. This circuit will also include either contacts CRSFe or CRSRe.

The energizing of relay CRSF will cause its contacts CRSFb, CRSFc and CRSFd to close, which if CRSR was energized contacts CRSRb, CRSRc and CRSRd will close. Either condition established a circuit by which to energize either the high speed or slow speed windings of the motor 34 (FIG. 15). A selection between such windings was made by the setting of the switch S9 which controls relay MS. If relay MS is released its contacts MSc will be open and its contact MSd will be closed. However, this information is initially overlooked due to contacts CRSP2b which initially prevents energizing relay CRSH. Rather, relay CRSL is energized through contacts CRSEb and CRSHa. This causes closing of contacts CRSHb, CRSHc and CRSHd to start the motor 34 running at slow speed.

The gears are caused to engage in the selected manner and the spindle bar 29 is caused to rotate by momentarily pushing the spindle start switch 238 to cause its contacts 238a to close and to cause its contacts 238b to open (FIG. 16). The momentary closing of the contacts 238a will energize a relay CRSP1 and contacts CRSP1a will close establishing a holding circuit to keep the solenoid CRSP1 energized. Contacts CRSP1b form a part of the circuitry for the energization of a solenoid CRSE and contacts CRSP1 to permit energizing of the various latching relays (FIG. 17). Also, contacts CRSP1d close (FIG. 15). In order to energize solenoid CRSE, current will have to flow through a path which will include either of the limit switches LSAL or LSAR, one of the limit switches LSBL or LSBR, one of the limit switches LSCL or LSCR and one of the limit switches LSDL or LSDR These limit switches are normally kept open by their engagement with the adjacent one of the piston rods 105, 93, 79 and 67 and the contacts of these limit switches are only permitted to close when the piston rod 105 moves out of engagement therewith or when the reduced diameter portions 140, 141, or 142 move into engagement with the actuating arms of such limit switches. There is one exception to this however. The contacts of limit switch LSAL are normally open and are only closed by the movement of the piston 106 to the extreme left end of the cylinder 107. From the foregoing, it will be apparent that only one of each of the pairs of the aforegoing limit switches will be closed when the clutch element with which it is associated is in its proper position. If a selection of spindle speed has been made which calls for the energization of relay CRA, contacts CRAc will be closed and contacts CRAd will be caused to open. This energizes solenoid AL to move the piston rod 105 to the left and close the contacts of limit switch LSAL. At the same time, the energization of solenoid CRA will have caused closure of its contacts CRAe to establish a flow for the path of current from the conductor 243 through the contacts 238b contacts CRSP1b, a normally closed pair of contacts CRSP2a and a conductor 247. Parallel circuits exist between the conductor 247 and a conductor 248. These parallel circuits include the limit switches LSBL and LSBR. Similarly, a conductor 249 may be connected electrically with the conductor 248 by either of parallel circuits including the limit switches LSCL and LSCR. Current can flow from the conductor 249 to a conductor 250 through alternate parallel circuits including the limit switches LSDL and LSDR. Whether the current will flow through either of the parallel circuits of each of the foregoing pairs will depend upon an agreement between the condition of a pair of contacts of one of the latching relays and the condition of the contacts of one of the aforesaid limit switches.

Going back to the limit switches LSAL and LSAR, if a speed selection was made which released relay CRA, solenoid Sol. AR would be energized through normally closed contacts CRAd. At the same time, normally closed contacts CRAf would close to establish an electrical connection between the conductor 247 and the conductor 243. If a speed selection is made which calls for the latching of the relay CRB, its contacts CRBc will close and its contacts CRBd will open to energize the solenoid Sol. BL and prevent energization of the solenoid Sol. BR. Simultaneously, contacts CRBe will close and contacts CRBf will open. The energizing of the solenoid BL should have moved the piston rod 93 to the left permitting the contacts of the limit switch LSBL to close, thereby establishing electrical connection between the conductors 247 and 248. If, on the contrary, a speed selection is made which releases the latching relay CRB, the contacts CRBf of the relay CRB will be closed and the piston rod 93 should have been moved to a position in which the reduced diameter portion 140 thereof is in registry with the actuating arm of the solenoid LSBR, thereby permitting the contacts of LSBR to close. This would then establish an electrical circuit between the conductors 247 and 248. Of course, it will be appreciated that an electrical circuit may only be established between the conductors 247 and 248 if the position of the limit switches LSBL and LSBR coincides with the latched or released condition of the relay CRB. Accordingly, no current can flow between the conductors 247 and 248 until the relay LSBL or LSBR confirms the fact that the clutch member 286 has in fact arrived at a position of engagement with the mating clutch element as called for by the setting of the switch assembly 237.

From the foregoing description, the manner of checking the positions of the clutch members 74 and 75 by means of the limit switches LSCL and LSCR, as well as the manner of checking the position of clutch member 64 by the positions of the limit switches LSDL and LSDR will be readily apparent. If the position of switch S7 has latched relay CRC, contacts CRCc will close to energize the relay Sol. CL and the contacts CRCd will close to prevent energization of the relay Sol. CR. At the same time, the contacts CRCe will close and the contacts CRCf will open. If the switch S8 calls for the latching of the relay CRD, contacts CRDc will close and the contacts CRDd will open to energize the solenoid DL. At the same time, contacts CRDe will close and contacts CRDf will open. In both cases the limit switches LSCL and LSCR will confirm the proper response of the clutch members 74 and 75 to the actuation of the solenoids Sol. CL or Sol. CR and the limit switches LSDL and LSDR will confirm the proper response of the clutch member 64 to the energization of the solenoid Sol. DL or Sol. DR. If the foregoing limit switches all confirm that the clutches are in the positions called for, the relay CRSE will be energized.

For various purposes it may be desireable to manually rotate the spindle bar 29. In order to do this the manually operated cam is adjusted to disengage the spindle sleeve 26 from the gearing by placing the clutch member 86 in a "neutral" position. When this is done a limit switch LSBN is operated to open its contacts and interrupt the circuit for relay CRSP1 and solenoid Sol. F. When the contacts of LSBN are closed however, it provides a path for the energizing of both the relay CRSP1 and Sol. F. The energizing Sol. F actuates the creeper clutch 47 and drag brake 46. This causes slow speed or "creep" rotation of the shaft 54 while the drag brake yieldably resists rotation of the sleeve 45. When the clutch 62 has engaged, the gears 55 and 72 will be "drag braked" until the clutches 74 and 75 have engaged. It should be pointed out that the spindle sleeve 26 provides sufficient friction to eliminate the need for a drag brake to hold the gears 96, 88 and 87 so that the clutch portions 100 and 101 will first engage and then the clutch 86 will engage.

The energizing of relay CRSE will cause its contacts CRSE*a* to close and its contacts CRSE*b* to open (FIG. 15). Its contacts CRSE*c* will close and its contacts CRE*d* will open. This de-energizes Sol. F and releases the creeper clutch 47 and drag brake 46. The closing of contacts CRSE*c* energizes the solenoid Sol. E and thereby actuates the spindl drive clutch 44. This causes the rotation of the drive shaft of the motor 34 to be transmitted to the sleeve 45 and thense through the gearing mentioned above to the spindle bar 29. The energizing of Sol. E also causes release of the spindle brake 53. As soon as the shaft picks up sufficient speed to actuate the plugging switch 82 and cause closure of either of its contacts 82*a* or 82*b*, a relay CRSP2 will be energized, causing its contacts CRSP2*a* to open and its contacts CRSP2*b* to close (FIG. 15). If the relay MS has been latched, the circuit will now be established to energize the high speed motor winding relay CRSH through a circuit including contacts CRSE*a*, MS*c*, CRSP2*d* and CRSL*d*. The energization of relay CRSH causes closure of its contacts CRSH*b*, CRSH*c*, CRSH*d*. This will select the high speed windings for the motor, dropping out the energization of the motor 34 through the low speed windings. The energization of relay CRSP2 also operates to open contacts CRSP2*c* and thereby disable the entire circuitry to the latching relays. The circuit had been previously closed by the closure of contacts CRSP1*c* to cause closure of its contacts CRSP1*b*. It is now possible to "dial in" new feed rates and spindle speeds on the switch assemblies 236 and 237 without disturbing the feed rates and spindle speeds in use.

It will be noted that the pressing of the spindle stop button 240 interrupts the energizing circuit to the relay CRSP1 which causes contacts CRSP1 to open and interrupts the energizing circuit for the relay CRSE. The contacts CRSE*a* are thereby caused to reopen to interrupt the energizing circuit for the relay CRSH and CRSL and de-energize the motor 34.

Turning now to the feed movement of the spindle bar 29, FIGURE 18 illustrates the arrangement of the contacts 234*a*, 234*b*, 234*c* and 234*d* of the switch 234 in the control circuitry. Furthermore, FIG. 13 indicates which of these contacts are open and which are closed for the various settings of the switch 234. In FIG. 13 the "O" indicates that the contacts are open and the "X" indicates the contacts are closed. To produce rapid forward or rapid reverse movement of the spindle bar 25, utilization is made of motor 35 which can be energized in either a forward or reverse direction. For example, if a rapid forward feed movement is desired, the contacts 234*a* are closed to energize a control relay CRBRF through normally closed contacts CRBRR*a*. Thereupon, contacts CRBRF*a* open to prevent energization of a control relay CRBRR. The energization of the control relay CRBRF also causes closure of its contacts CRBRF*b*, CRBRF*c* and CRBRF*d*. This will operate the bar feed rapid motor 35 in one direction of rotation to produce rotation of lead screw 40. If the reverse direction of feed movement of the spindle bar 29 is desired, the switch 234 is set to a position in which its contacts 234*b* only are closed in order to energize the solenoid CRBRR thereby opening its contacts CRBRR*a* and closing its contacts CRBRR*b*, CRER*c*, CRBRR*d*. This causes energization of the motor 35 from the power sources 246 in a manner to turn the drive shaft 150 thereof in the opposite direction.

If a slow measured feed movement of the spindle bar 29 is desired, corresponding to one of the feed rates indicated on the chart of FIG. 12, the switch 234 is adjusted to either the "feed forward" or "feed reverse" positions, the first of which will close the contacts 234*c* and the second of which will close the contacts 234*d*. Closure of the contacts 234*c* will establish an energizing circuit for the solenoid Sol. J, while the closure of the contacts 234*d* will establish energizing circuit for the solenoid Sol. K. Assuming that the spindle drive motor 34 is running in the forward direction, (that is that it is being energized through the contacts of the relay CRSF), the contacts CRSF*f* and CRSF*g* will be closed. Also assuming that the switch 241 is set for the boring mode, an energizing circuit will be established through the contacts CRSF*f* and contacts CRT*c* and contacts CRFS*a* to energize the solenoid Sol. J when the contacts 234*c* are closed. The contacts CRSF*f* and CRT*c* are bypassed through contacts CRT*d* when the switch 241 is set for the boring mode of operation. The energization of the solenoid Sol. J actuates the bar feed forward drive clutch 161 to produce rotation of the lead screw 40 in the desired direction. Should, however, the drive spindle motor 34 be rotating in the opposite direction, the bar feed drive reverse clutch 162 would have to be actuated instead of the clutch 161 in order to produce rotation of lead screw 40 in the same direction. Under these circumstances, the contacts CRSF*f* would be open and contacts CRSR*f* would be closed as would contacts CRSR*g*. An energizing circuit for the solenoid Sol. K would then be established from the contacts 234*c* through contacts CRSR*f* and normally closed contacts CRT*e* and CRFS*b*.

If reverse bar feed movement is desired, the switch 234 is adjusted to the position in which contacts 234*d* are closed and, assuming that the spindle drive motor 34 is being driven in the forward direction, an energizing circuit for the solenoid Sol. K will be established through now closed contacts CRFS*g*, contacts CRT*e* and CRFS*b*. If the machine is set to the tapping mode by operation of the switch 241, contacts CRT*f* will be closed to provide a bypass around contacts CRSF*g* and CRT*e*. Should the spindle motor be operating in the reverse directions, contacts CRFS*g* will be opened and the solenoid Sol. K will be actuated through a circuit including the contacts 234*d*, contacts CRSR*g*, CRT*c* and CRFS*a*. If the machine is set in the boring mode and relay CRBU is latched, its contacts CRBU*d* will close to energize relay CRFS. This causes contacts CRFS*a* and CRFS*b* to open and prevent energizing Sol. K or Sol. J. This prevents the use of high fed rates during a boring operation.

In the operation of the lead screw 40 from the bar rapid motor 35 no rotary motion will be transmitted from the shaft 154 unless the bar rapid clutch 151 is energized. This accomplished by energizing the solenoid Sol. P through either contacts CRBRR*e* or CRBRF*e*. This will happen automatically upon the energization of the bar rapid forward or reverse control relays CRBRR or CRBRF. It will be noted that the relay CRE has a normally open pair of contacts CRE*b* and a normally closed pair of contacts CRE*e* arranged in energizing circuits for the solenoids Sol. HR and Sol. LR respectively. Accordingly, when the relay CRE is energized the solenoid Sol. HR will be energized and when the relay CRE is de-energized, the solenoid Sol. LR will be energized. By this means a selection is made as to whether the shaft 166 will be driven by the shaft 199 at a relatively high speed of rotation or by the shaft 197 at a much lower rate of rotation.

From the foregoing it will be apparent that the controls for actuating the mechanism of FIGS. 3 and 4 have a number of important advantages. For example, the circuitry through which the relay CRSE is energized assures that the mechanical dog tooth clutch of the spindle drive mechanism are in proper engagement before the drive clutch 44 is actuated. At the same time the clutch 44 will engage and start rotating the spindle sleeve 26 just as soon as the drive train is in readiness for the transmission of torque. This eliminates the necessity for "waiting out" long pre-set time delays which might be quite unnecessary if the shifting of gears was not extensive.

It will also be noted that the shiftable clutch members 64, 74 and 75 and 86 are on the driver shaft of the "step down" gearing. This eliminates "feed back" rotation of the unused gear on the driving shaft at a very high rate of rotation. It also reduces noise and heat.

It should be mentioned that the utilization of the plugging switch accomplishes several desirable functions. First it permits the motor 35 always to be started through its low speed windings and thereafter shift to the high speed windings if they are called for. Secondly, the operation of the plugging switch effects the disabling of the circuit to the latching relays while a machining operation is in progress. This permits the new feed rates and speeds to be selected ahead of time and while the machine operator is not otherwise occupied.

Of course, it is important to note that the toothed mechanical gears of the spindle drive mechanism are not shifted under a heavy load. The only load applied thereto during the shifting is by the drag brake 46 which yields rather readily to permit the gears to turn after engagement of the clutch between them and the sleeve 45. Furthermore, the worm 51 and worm gear 52 provide a very great reduction in speed to the clutches which engage at a very low speed.

Finally, the design of the toothed dog clutch members and portion of FIG. 3 is believed to be ideally suited for the transmission of heavy loads to a machine tool drive spindle and this design enables the teeth to be very accurately machined and to operate in a positive, tight fitting manner. The use of this design for the clutches of feed mechanism is not as important in view of the relative low power being handled.

While it will be apparent that the preferred embodiment herein illustrated is well calculated to fulfill the objects above stated, it will be appreciated that the invention is susceptible to modification, variation and change without departing from the proper scope or fair meaning of the subjoined claims.

What is claimed is:

1. In a machine tool having a tool supporting spindle, a drive motor and a mechanism for transmitting rotary motion from said motor to said spindle, said mechanism having a plurality of adjustable elements operable upon the adjustment thereof to transmit rotary motion to said spindle at different speeds, that improvement which comprises control means for said mechanism including a plurality of shifter means for adjusting said adjustable elements, a control circuit including a plurality of latching relays, each of said relays being operable to initiate movement of one of said shifters, a plurality of switches for latching and releasing said relays and means for disabling said circuit during a machining operation to permit resetting of said switches without disturbing a machining operation in progress.

2. In a machine tool having a tool supporting rotary spindle, a drive motor and a mechanism for transmitting rotary motion from said motor to said spindle, that improvement wherein said mechanism includes a driving shaft, a first driven member and a first clutch for driveably connecting said driving shaft and said first driven member, a plurality of pairs of toothed clutch elements between said first driven member and said spindle, a second driven member, a clutch for driveably connecting said second driven member and said driving shaft, means driven by said second driven member for slowly rotating a driven one of said clutch elements, a drag brake for yieldably braking said first driven member, and means operable to operate said brake and motor while engaging said second clutch and disengaging said first clutch.

3. The structure set forth in claim 2 including unidirectionally driveable means between said second driven member and said driven clutch element and an hydraulically operated clutch between said unidirectionally driveable means and said driven clutch element operable to brake said spindle when said second driven member is stationary.

4. A mating pair of co-axial clutch elements having axially extending, annularly arranged teeth spaced apart by grooves, the teeth of one clutch element having parallel side walls on opposite sides thereof parallel to a radius through the centers thereof and the grooves of the other clutch element having parallel side walls on the opposite sides thereof spaced to snugly receive the teeth of said one clutch element therebetween, the opposite side walls of each groove of said first clutch element and the opposite side walls of each tooth of said other clutch element extending radially inwardly toward one another.

5. The structure set forth in claim 4 wherein some of the teeth of each clutch element have a greater axial dimension than the other teeth thereof.

6. In a machine tool having a rotary tool supporting spindle and a drive motor, that improvement which comprises a power transmission between said motor and said spindle including two alternately operable gear paths and a shiftable torque transmitting member movable between a position in torque transmitting relation with one of said gear paths and a position in torque transmitting relation with the other of said gear paths, means for preselecting a given one of said gear paths, means responsive to a command signal for moving said shiftable member to a given one of its said positions in which it is in torque transmitting relation with a preselected one of said gear paths, and switch means operable to sense the presence of said shiftable member in its said given position, said switch means being operable to prevent the delivery of torque to said shiftable member subsequent to said command signal when said shiftable member is not in its given position.

7. The structure set forth in claim 6 including an electrically controlled hydraulic clutch disposed between said drive motor and said shiftable member, said hydraulic clutch being subject to the control of said switch means.

8. The structure set forth in claim 6 wherein said clutch member is driven from the selected said gear path.

9. The structure set forth in claim 6 wherein said shiftable member comprises a clutch element splined on a driven shaft, said clutch element having oppositely facing clutch teeth engageable alternately with clutch teeth associated with one gear of each of said pairs of gears.

10. The structure set forth in claim 6 including a plurality of pairs of alternate gear paths, each of which is provided with two pairs of gears, a shiftable clutch member and a switch means, and hydraulically operated clutch means operable to prevent the delivery of torque through said transmission unless the clutch member of each set is in driving relation with the selected gear path thereof.

References Cited

UNITED STATES PATENTS

| | | | |
|---|---|---|---|
| 1,753,505 | 4/1930 | Dyer | 192—48 |
| 2,405,171 | 8/1946 | Wildhaber | 192—108 |
| 2,519,080 | 8/1950 | Simpson | 192—.084 |
| 3,151,505 | 10/1964 | Reichert et al. | 77—32.1 |

FOREIGN PATENTS 122,348  1/1919  Great Britain.

MARTIN P. SCHWADRON, *Primary Examiner.*

C. LEEDOM, *Assistant Examiner.*